US008738214B2

(12) United States Patent
Olsen et al.

(10) Patent No.: US 8,738,214 B2
(45) Date of Patent: May 27, 2014

(54) METHOD OF DETERMINING A STATUS OF A VEHICLE ON A ROADWAY AND METHOD AND SYSTEM OF COMMUNICATING THE SAME

(75) Inventors: Jeffrey J. Olsen, Royal Oak, MI (US); Scott W. Otterson, Clinton Township, MI (US)

(73) Assignee: General Motors LLC, Detroit, MI (US)

( * ) Notice: Subject to any disclaimer, the term of this patent is extended or adjusted under 35 U.S.C. 154(b) by 39 days.

(21) Appl. No.: 13/113,660

(22) Filed: May 23, 2011

(65) Prior Publication Data

US 2012/0303203 A1 Nov. 29, 2012

(51) Int. Cl.
*G08G 1/00* (2006.01)
*G06F 7/00* (2006.01)
*G08G 1/01* (2006.01)

(52) U.S. Cl.
CPC .................................. *G08G 1/0133* (2013.01); *G08G 1/012* (2013.01)
USPC .......... 701/29.1; 701/118; 701/423; 701/117; 340/989; 340/905

(58) Field of Classification Search
USPC ............. 701/117, 29; 340/995, 989, 955, 905
See application file for complete search history.

(56) References Cited

U.S. PATENT DOCUMENTS 5,164,904 A * 11/1992 Sumner ......................... 701/117
6,012,012 A * 1/2000 Fleck et al. ................... 701/117
6,150,961 A * 11/2000 Alewine et al. ............ 340/995.1
6,333,703 B1 12/2001 Alewine et al.
6,501,700 B2 * 12/2002 Pascucci .................. 365/230.04
6,510,377 B2 * 1/2003 Phung et al. .................. 701/117
6,622,087 B2 * 9/2003 Anderson ...................... 701/423
6,900,740 B2 5/2005 Bloomquist et al.
7,110,880 B2 * 9/2006 Breed et al. ................... 701/482
7,246,007 B2 * 7/2007 Ferman .......................... 701/409
7,366,606 B2 * 4/2008 Uyeki ............................ 701/117
7,421,395 B1 * 9/2008 Link et al. ..................... 705/319
7,548,805 B2 * 6/2009 Yamaguchi et al. ............ 701/36
7,576,661 B2 * 8/2009 Mochizuki .................... 340/905
7,813,870 B2 * 10/2010 Downs et al. ................. 701/117
8,112,219 B2 * 2/2012 Johnson et al. ............... 701/117
8,155,867 B2 * 4/2012 Krause .......................... 701/123
2001/0029425 A1 10/2001 Myr
2002/0054537 A1 * 5/2002 Pascucci ....................... 365/236
2002/0059234 A1 * 5/2002 Gumpertz et al. ................ 707/7

(Continued)

OTHER PUBLICATIONS

Joon, Jungkeun et al. Electrical Engineering and Computer Science, University of Michigan at Ann Arbor, MobiSys'07, Jun. 11-14, 2007, San Juan, Puerto Rico, Copyright 2007, ACM 978-1-59593-614-1/07/0006.*

(Continued)

*Primary Examiner* — John R Olszewski
*Assistant Examiner* — Jean-Paul Cass
(74) *Attorney, Agent, or Firm* — Dierker & Associates, P.C.

(57) ABSTRACT

A method of determining a status of a vehicle on a roadway, in one example, includes monitoring a then-current vehicle speed by an in-vehicle processor, and during the monitoring, determining that the speed has exceeded a pre-established threshold speed. When the speed exceeds the threshold speed, an algorithm is triggered. Upon triggering the algorithm, a sub-routine is initiated that determines if the vehicle is caught in a traffic jam. Also disclosed herein is a method and system for communicating the vehicle status determination to an outside entity.

23 Claims, 3 Drawing Sheets

(56) References Cited

U.S. PATENT DOCUMENTS

| | | | | |
|---|---|---|---|---|
| 2003/0018917 | A1 * | 1/2003 | Brown, Sr. | 713/201 |
| 2007/0100537 | A1 | 5/2007 | Parikh et al. | |
| 2007/0112503 | A1 | 5/2007 | Johnson et al. | |
| 2007/0225894 | A1 | 9/2007 | Tsukamoto | |
| 2008/0021640 | A1 * | 1/2008 | Pyo | 701/209 |
| 2008/0024323 | A1 | 1/2008 | Kadaba | |
| 2010/0036595 | A1 * | 2/2010 | Coy et al. | 701/119 |
| 2010/0191403 | A1 * | 7/2010 | Krause | 701/29 |

OTHER PUBLICATIONS

Murph, Darren, "Twitter integration could come to OnStar", Mar. 28, 2009, http://www.engadget.com/2009/03/28/twitter-integration-could-come-to-onstar, 1pg.

* cited by examiner

METHOD OF DETERMINING A STATUS OF A VEHICLE ON A ROADWAY AND METHOD AND SYSTEM OF COMMUNICATING THE SAME

TECHNICAL FIELD

The present disclosure relates generally to methods of determining a status of a vehicle on a roadway, and to methods and systems of communicating the same.

BACKGROUND

Traffic jam detection may be accomplished by sending traffic-related information from one or more probe vehicles on a roadway to a central back office, such as a telematics service or call center. In an example, the central back office processes the traffic-related information (via, e.g., a computer program executed by processing equipment) to determine at least the traffic conditions on that roadway and if, e.g., a traffic jam exists.

SUMMARY

A method of determining a status of a vehicle on a roadway is disclosed herein. One example of the method includes monitoring a then-current vehicle speed by a processor disposed in the vehicle, and during the monitoring, determining that the then-current vehicle speed has exceeded a pre-established threshold speed. An algorithm is triggered upon determining that the then-current vehicle speed has exceeded the threshold speed. Upon triggering the algorithm, a sub-routine is initiated which includes computer readable code for: processing data over a predetermined time interval to obtain input data, the data being chosen from an average vehicle speed, a vehicle heading signal, and combinations thereof; one of maintaining or incrementing a jam score based on the input data, the incrementing including changing the jam score by a single numerical digit; processing updated data over at least one other predetermined time interval to obtain updated input data; and one of maintaining or incrementing the jam score based on the updated input data. When the jam score reaches a predefined jam score, the method further includes triggering an indicator signifying that the vehicle is then-currently in a traffic jam; or when the jam score is maintained below the predefined jam score, the method further includes repeating the processing of updated data and the one of maintaining or incrementing the jam score until the algorithm is stopped or the jam score reaches the predefined jam score.

Also disclosed herein are a method and a system of communicating the status of the vehicle on the roadway.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
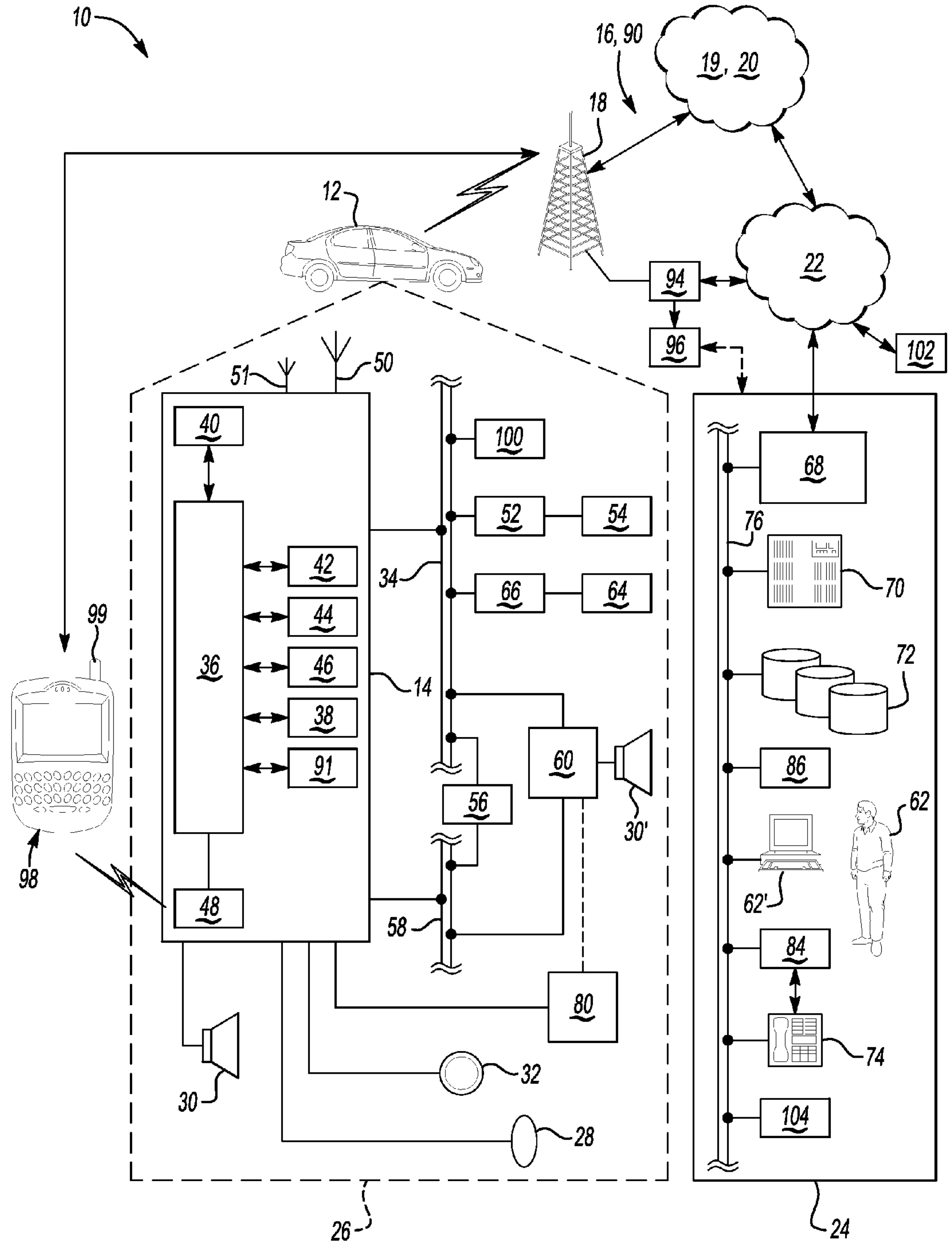
FIG. 1 is a schematic diagram depicting an example of a system of determining a status of a vehicle on a roadway.

Example(s) of a method of determining the status of a vehicle on a roadway, as disclosed herein, may be used, e.g., to determine whether or not the vehicle is then-currently caught in a traffic jam on that particular roadway. The determination of the vehicle status may be accomplished utilizing an algorithm executable by a processor onboard the vehicle, where the algorithm utilizes input data received by a telematics unit from one or more vehicle systems (via, e.g., a data link) to ultimately make the vehicle status determination. In this manner, the vehicle status determination is accomplished i) entirely within the vehicle without any assistance from an outside data processing facility (such as, e.g., a central back office, telematics service center, or the like), and ii) independently from other vehicles on the roadway.

Also disclosed herein are example(s) of a method and a system for communicating the status of the vehicle on the roadway. In some examples, the communication means enables the vehicle to become a participant in online social networking. This may be accomplished, e.g., by enabling the vehicle to update a networking website (such as a social networking website (e.g., a Facebook™ page), a professional networking website (e.g., a LinkedIn® page), or the like) with information pertaining to the then-current status of the vehicle on the roadway. This information may be viewable, for instance, by members (or friends) of the vehicle owner's online networking group.

In other examples, the communication means enables the vehicle to initiate a vehicle data upload event with an outside facility, such as, for example, a central back office or telematics service center. Upon receiving the information from the vehicle (e.g., as packetized data), the outside facility may utilize the information to update its own records and/or to forward the information to a third party such as a traffic control center. In some instances, the outside facility may also act as a gateway for posting the information onto the vehicle user's social networking website.

As used herein, the term "user" refers to i) a vehicle owner, a vehicle driver, and/or a vehicle passenger and/or ii) a person or entity who/that participates in online networking. It is to be understood that the term "user" may be used interchangeably with the terms subscriber and/or service subscriber. In some of the examples of the methods described below, the user has his/her own personal webpage upon which information may be posted, and may further have his/her own mobile communications device.

Further, the term "member" refers to a person or entity who/that has been invited, by the user of a networking page, to access and view the networking page, and such person or entity has accepted the user's invitation. A member may also refer to a person or entity who/that has invited the user to be part of a networking group, and the user has accepted the invitation. It is to be understood that the networking page is generally associated with a host server. As used herein, a "host server" refers to a processor or computer upon which information of a website resides. In some of the examples disclosed herein, the website is a networking site, examples of which include a professional and/or social networking site. Non-limiting examples of networking sites include Facebook™, Twitter™, LinkedIn®, and MySpace®. It is to be understood that the term "member" may be used interchangeably with the term "friend".

Furthermore, the term "post," as used herein, may be used as a noun that refers to a message (such as, e.g., a data message, a picture, a video, etc.) that is uploaded or posted onto the host server of the website hosting the user's personal webpage.

Yet further, a "traffic jam" refers to a plurality of vehicles in a particular location on a single roadway, where the plurality of vehicles is so obstructed that the vehicles can scarcely move. In an example, obstruction of the vehicles is such that the vehicles move, if at all, at a speed of about 10 mph or less. Further, as used herein, the term "roadway" refers to any paved or unpaved surface upon which the vehicle 12 may travel from one location to another. For automobiles, motorcycles, or other land vehicles, the roadway may be a road, street, lane, highway, boulevard, court, or other surface recognized as a public access or passage way for land vehicles. For water vehicles (e.g., boats), the roadway may be a particular waterway in a lake, ocean, river, or other body of water that is also recognized as a public access or passage for water vehicles. Further, for air vehicles (e.g., airplanes, helicopters, etc.), the roadway may be a piece of airspace that is recognized as a public access or passage for air vehicles.

Additionally, the term "communication" is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

An example of a system 10 that may be used for determining the status of a vehicle on a roadway, and for communicating the status of the vehicle on the roadway is schematically depicted in FIG. 1. This system 10 is described below as including a telematics service center 24 as a central back office for subscriber vehicles. It is to be understood, however, that the system 10 may include any facility, including those that do not necessarily provide telematics services. Some examples of facilities other than telematics service centers include traffic control centers, public safety facilities (e.g., police stations, fire stations, etc.), public health facilities (e.g., hospitals, etc.), private businesses, media facilities (e.g., radio networks, television networks, etc.), and/or the like.

Additionally, the examples of the vehicle status determination method will be described below in conjunction with FIGS. 2 through 5, and the examples of communicating the vehicle status will be described in conjunction with FIG. 6. The examples utilize a road vehicle (e.g., an automobile) as the vehicle, and the roadway will be described below as being a highway (e.g., an expressway, freeway, or the like).

The system 10 depicted in FIG. 1 generally includes a mobile vehicle 12, a telematics unit 14 operatively disposed in the mobile vehicle 12, a carrier/communication system 16 (including, but not limited to, one or more cell towers 18, one or more base stations 19 and/or mobile switching centers (MSCs) 20, and one or more service providers (e.g., 90) including mobile network operator(s)), one or more land networks 22, and one or more telematics service centers 24. In an example, the carrier/communication system 16 is a two-way radio frequency communication system, and may be configured with a web service supporting system-to-system communications (e.g., communications between the telematics service center 24 and the service provider 90).

For purposes of illustration, the system 10 will be described below using a car as the mobile vehicle 12, and this vehicle 12 includes a number of vehicle systems that contribute to the overall operation of the vehicle 12. An example of such a system includes a vehicle ignition system (not shown), which may be used to power on the vehicle 12, for example, by turning an ignition key, pressing an ignition button inside the vehicle 12 or on a vehicle key fob, or the like. Another example of a vehicle system includes a transmission system 100 that is responsible for the mobility of the vehicle 12. The vehicle transmission system 100 utilizes a transmission shifting lever to switch between various operational modes of the vehicle 12, such as between a drive mode, a park mode, a reverse mode, etc. The transmission system 100 may be manual or automatic, and while in the drive mode, the transmission system 100 may be changed (either manually or automatically based on the type of transmission system) between various gears (e.g., first gear, second gear, third gear, etc.). In an example, the vehicle transmission system 100 may have associated therewith its own processor (not shown in FIG. 1), which sends signals to the telematics unit 14 using a data link when the operation mode of the vehicle transmission system 100 changes (e.g., drive mode, park mode, etc.) or when a gear of the transmission system 100 changes (e.g., from first gear to second gear, etc.). The transmission system processor may be operatively connected to the telematics unit 14 via a vehicle bus 34, which is described further hereinbelow.

The wireless carrier/communication system 16 may be used to establish communication between a mobile communications device 98 and the telematics unit 14. The mobile communications device 98 may be owned or otherwise possessed by the user, and the mobile device 98 may be used by the user (e.g., when outside of the vehicle 12) to call the telematics unit 14 over the wireless carrier/communication system 16. However, when the device 98 is located within close proximity (i.e., a distance suitable for short range wireless communication) of the telematics unit 14, communication between the mobile device 98 and the telematics unit 14 may be established via short range wireless connection (e.g., by pairing the telematics unit 14 and the mobile device 98 using a BLUETOOTH® connection or the like). In one example, the mobile device 98 is in close proximity of the telematics unit 14 when the mobile device 98 is inside a passenger compartment of the mobile vehicle 12 (e.g., when the device 98 is on the person of the user, or stowed inside the passenger compartment while the vehicle 12 is moving). Further details of pairing the mobile device 98 with the telematics unit 14 will be provided below.

In an example, the carrier/communication system 16 also includes a host server 94 including suitable computer equipment (not shown) upon which information of a remotely accessible page 96 resides/is stored. As disclosed herein, one of the websites may be a networking site with which the remotely accessible page 96 (e.g., a webpage) is associated, and another website may be a service site and/or account managing site associated with the telematics service center 24. In an example, the remotely accessible page 96 is a networking page set up and maintained by the user, for instance, and this webpage 96 is hosted by a social networking website. While, in this example, the webpage 96 is discussed as being a personal webpage of the user, it is to be understood that the webpage 96 may be run and owned by the entity operating the networking website and is stored on the host server 94. It is further to be understood that the webpage 96 may also be run and owned by the user who operates his/her own networking site, where this site is stored on a user-owned host server.

The overall architecture, setup and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method(s) disclosed herein.

Vehicle 12 may be a mobile land vehicle (such as a motorcycle, car, truck, recreational vehicle (RV), or the like), a water vehicle (such as a boat) or an air vehicle (such as a plane, helicopter, or the like), and the vehicle 12 is equipped with suitable hardware and software that enables it to communicate (e.g., transmit and/or receive voice and data communications) over the carrier/communication system 16.

Some of the vehicle hardware 26 is generally shown in FIG. 1, including the telematics unit 14 and other components that are operatively connected to the telematics unit 14. Examples of other hardware 26 components include a microphone 28, speakers 30, 30' and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34, as mentioned above. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. In an example, the telematics unit 14 is linked to the telematics service center 24 via the carrier system 16, and is capable of calling and transmitting data to the telematics service center 24.

The telematics unit 14 provides a variety of services, both individually and through its communication with the telematics service center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components (e.g., the real time clock 46). In some examples of the method disclosed herein, the telematics unit 14 includes the short range wireless network 48. It is to be further understood that telematics unit 14 may also include additional components and functionality as desired for a particular end use.

The electronic processing device 36 of the telematics unit 14 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. The electronic processing device 36 (also referred to herein as a processor) may, for example, include software programs having computer readable code to initiate and/or perform various functions of the telematics unit 14, as well as computer readable code for performing various steps of the examples of the methods disclosed herein. For instance, the processor 36 may include software programs that include computer readable code encoded on a computer readable medium for monitoring a then-current vehicle speed and, during the monitoring, determining when the then-current vehicle speed exceeds a pre-established threshold value. The processor 36 further includes an algorithm including computer readable code encoded on a computer readable medium that may be executed by the processor 36 upon making the determination that the vehicle speed has exceeded the threshold value. This algorithm includes at least one sub-routine, and the algorithm is used to ultimately determine if the vehicle 12 is caught in a traffic jam and/or if the vehicle 12 is no longer caught in a traffic jam. An example of the algorithm will be described in detail below in conjunction with FIGS. 2 through 5.

The processor 36 also includes computer readable code for initiating communication of the vehicle status determination (in the form of vehicle status data) to an outside entity. Examples of communicating the vehicle status to an outside entity are shown and discussed in reference to FIG. 6. The computer readable code for initiating the communication may be part of the algorithm described in conjunction with FIGS. 2 through 5.

The vehicle status data may be communicated to an outside entity (i.e., an entity outside of the vehicle 12), such as by transmitting the status of the vehicle 12 to a data aggregator 104 at the telematics service center 24. This may be accomplished during a voice connection in the form of packet data over a packet-switch network (e.g., voice over Internet Protocol (VoIP), communication system 16, etc.). The telematics unit 14 includes a vehicle data upload (VDU) system 91 or is interfaced to the VDU system 91. As used herein, the VDU system 91 is configured to receive data (i.e., vehicle status data) from the processor 36 generated by the algorithm, packetize the data and place the data into a suitable format for uniform transmission to the data aggregator 104, and transmit the packetized data message to the data aggregator 104. In some cases, the data received from the processor 36 may already be packetized, and in such instances, the VDU 91 will simply revise the format for uniform transmission of the data to the data aggregator 104. Revising the format may include, for example, re-packetizing the data for transmission over the wireless communication system 16 (which may require a different format than the format of the data received by the processor 36). In one example, the VDU 91 is operatively connected to the processor 36 of the telematics unit 14, and thus is in communication at least with the data aggregator 104 via the buses 34 and 76 and the communication system 16. In another example, the VDU 91 may be the telematics unit's central data system that can include its own modem, processor, and onboard database. The database can be implemented using a separate network attached storage (NAS) device or be located elsewhere, such as in the memory 38, as desired. The VDU 91 has an application program that handles all of the vehicle data upload processing, including communication with the data aggregator 104.

Still referring to FIG. 1, the location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The GPS component 44 may be associated with its own processor (not shown) that obtains vehicle heading signals, and transmits those signals to the telematics unit 14 via the bus 34. As used herein, a "heading signal" is a signal containing information related to the compass direction the vehicle 12 is then-currently traveling or moving toward. The heading signal may, e.g., be used along with other data in the algorithm to ultimately determine if the vehicle 12 is caught in a traffic jam, and/or if the vehicle 12 is no longer caught in a traffic jam if previously caught.

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies, such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi. In other instances, the protocol is Evolution Data Optimized (EVDO) Rev B (3 G) or Long Term Evolution (LTE) (4 G).

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12, vehicle operations, vehicle user preferences and/or personal information, and the like.

The telematics unit 14 provides numerous services alone or in conjunction with the telematics service center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the telematics service center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. In one example, an Evolution Data Optimized (EVDO) Rev B (3 G) system (which offers a data rate of about 14.7 Mbit/s) or a Long Term Evolution (LTE) (4 G) system (which offers a data rate of up to about 1 Gbit/s) may be used. These systems permit the transmission of both voice and data simultaneously. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker(s) 30, 30' provide verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and telematics service center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service center 24 (whether it be a live advisor 62 or an automated call response system 62') to request services, to initiate a voice call to another mobile communications device, etc.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system (e.g., speaker 30'), or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, speed sensors, magnetometers, emission detection and/or control sensors, environmental detection sensors, and/or the like. One or more of the sensors 64 enumerated above may be used to obtain vehicle data for use by the telematics unit 14 or the telematics service center 24 (when transmitted thereto from the telematics unit 14) to determine the operation of the vehicle 12. Example sensor interface modules 66 include powertrain control, climate control, body control, and/or the like.

In an example, each of the vehicle sensors 64 is associated with its own processor (not shown), which may include computer program(s) for obtaining information from the sensors 64 and either utilizing them to perform various vehicle functions and/or to send the information (e.g., as signals) to another processor in the vehicle 12 (e.g., the processor 36) to be utilized in other computer program(s). For instance, the speed sensor may be associated with its own processor that obtains speed signals from the speed sensor and transmits those signals to the processor 36 of the telematics unit 14 via the bus 34. The processor 36 utilizes the speed signals in the algorithm, and the speed signals include information pertaining to the instantaneous speed of the vehicle 12. The instantaneous (or then-current) vehicle speed may be used to trigger the vehicle status determination algorithm if the vehicle speed exceeds a threshold speed. The instantaneous vehicle speed may also be used during processing by the processor 36 to obtain other information such as an average vehicle speed, maximum speed, or the like, and this information may be used as input data for the algorithm.

The vehicle hardware 26 includes the display 80, which may be operatively directly connected to or in communication with the telematics unit 14, or may be part of the audio component 60. The display 80 may be any human-machine interface (HMI) disposed within the vehicle 12 that includes audio, visual, haptic, etc. The display 80 may, in some instances, be controlled by or in network communication with the audio component 60, or may be independent of the audio component 60. Examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

As mentioned above, the system 10 includes the carrier/communication system 16. A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the telematics service center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks, such as wireless local networks (WLANs) or networks providing broadband wireless access (BWA), or any combination thereof.

The telematics service centers 24 of the telematics service provider (also referred to herein as call centers) are designed to provide the vehicle hardware 26 with a number of different system back-end functions. According to the example shown in FIG. 1, one call center 24 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of service center 24 functions. Further, the various operations of the service center 24 are carried out by one or more computers (e.g., computer equipment 74) programmed to carry out some of the tasks of the service center 24. The computer equipment 74 (including computers) may include a network of servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

Additionally, for purposes of the instant disclosure, the telematics service center 24 is in selective and operative communication with the telematics unit 14 and host server 94, and may be configured to post vehicle status data onto the user's personal webpage 96. In an example, the telematics service center 24 further includes the data aggregator 104, as previously mentioned, which is embodied at the telematics service center 24 as a data aggregation module. The data aggregator 104 may be in selective and operative communication with the telematics unit 14 via the communication system 16, and may, in some instances, receive and bin data generated from the algorithm executed by the processor 36 of the vehicle telematics unit 14. The data aggregator 104 may otherwise be operatively connected to the communication module 86 at the service center 24 (via, e.g., the bus 76), and is configured to receive and bin the vehicle status data upon receiving it from the communications module 86. In these instances, the data aggregator 104 may simply be a data repository. In other instances, the data aggregator 104 is also capable of running computer readable code/software routines for receiving and processing the vehicle status data generated by the algorithm, e.g., to determine how to format the data and/or where to report the data. For instance, upon processing the data, the data aggregator 104 may re-format the data (which may be in a machine-readable form upon receiving the data) into a human-readable form, and post the re-formatted data onto the user's personal webpage 96. In instances where the data aggregator 104 is simply a data repository, re-formatting of the data may otherwise be accomplished via a computer software program run by the processor 84 at the telematics service center 24, which retrieves the data from the data aggregator 104, re-formats the data, and posts the re-formatted data onto the user's personal webpage 96.

In another example, the data aggregator 104 (in instances where it includes its own processor) or the processor 84 may further contain computer readable code for reporting (i.e., communicating) the received vehicle status data to another facility 102, such as a traffic control center or the like. The reporting of the vehicle status data may be accomplished via a wireless connection, a landline, the Internet, a short message service message, and/or the like. In an example, the data aggregator 104 (or the processor 84) further includes suitable computer readable code for filtering the data and/or for performing data conditioning processes to place such data in form for transmission to the other facility 102.

Further, the database(s) 72 may be designed to store subscriber profile records, subscriber behavioral patterns, or any other pertinent subscriber information. In an example, the database(s) 72 may be configured to store a subscriber profile, which may contain personal information of subscriber (e.g., the subscriber's name, garage address, billing address, home phone number, cellular phone number, etc.), as well as subscriber selected preferences (e.g., how the data should be presented as a post on his/her personal webpage 96, etc.).

The communications module 86 is configured, via suitable communications equipment (such as equipment capable of handling messaging between the telematics service center 24 and the telematics unit 14 (e.g., VehComm), modems, TCP/IP supporting equipment, and/or the like), to enable the telematics service center 24 to establish a communication with the telematics unit 14, or visa versa. The communications module 86 is capable of receiving data messages (i.e., packet data) from the telematics unit 14, identify that the data pertains to the then-current status of the vehicle 12 on a roadway, and transmit the data messages to the data aggregator 104. The data aggregator 104 may run computer readable code/software routines that can receive the data, determine where to send the data to, and one of i) transmit such data to the proper location, ii) upload such data as a post on the host server 94 of the user's personal webpage 96, or iii) store such data for internal telematics service center 24 use. The service center 24 may, for example, aggregate the data with vehicle status data obtained from other vehicles on the roadway to determine then-current traffic conditions. In this aspect, the vehicle 12 may be used as a virtual traffic probe.

It is to be appreciated that the service center 24 may be any central or remote facility, manned or unmanned, mobile or fixed, to or from which it is desirable to exchange voice and data communications. As such, the live advisor 62 may be physically present at the service center 24 or may be located remote from the service center 24 while communicating therethrough.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service provider service center 24, the telematics service provider is a separate and distinct entity from the network provider 90. In an example, the equipment, employees, etc. of the communications network provider 90 are located remote from the service center 24. The communications network provider 90 provides the user with telephone and/or Internet services, while the telematics service provider provides a variety of telematics-related services (such as, for example, those discussed hereinabove). The communications network provider 90 may interact with the service center 24 to provide services (such as emergency services) to the user.

While not shown in FIG. 1, it is to be understood that in some instances, the telematics service provider operates a data center, which receives voice or data calls, analyzes the request associated with the voice or data call, and transfers the call to an application specific telematics service center associated with the telematics service provider. It is further to be understood that the application specific telematics service center may include all of the components of the data center, but is a dedicated facility for addressing specific requests, needs, etc. Examples of application specific telematics service centers include, but are not limited to, emergency services call centers, navigation route call centers, in-vehicle function call centers, or the like.

The telematics service center 24 components shown in FIG. 1 may also be virtualized and configured in a Cloud Computer, that is, Internet-based computing environment. For example, the computer equipment 74 may be accessed as a Cloud platform service, or PaaS (Platform as a Service), utilizing Cloud infrastructure rather than hosting computer equipment 74 at the telematics service center 24. The database 72 and server 70 may also be virtualized as a Cloud resource. The Cloud infrastructure, known as IaaS (Infrastructure as a Service), typically utilizes a platform virtualization environment as a service, which may include components such as the processor 84, database 72, server 70, and computer equipment 74. In an example, application software and services (such as, e.g., navigation route generation and subsequent delivery to the vehicle 12) may be performed in the Cloud via the SaaS (Software as a Service). Subscribers, in this fashion, may access software applications remotely via the Cloud. Further, subscriber service requests may be acted upon by the automated advisor 62', which may be configured as a service present in the Cloud.

Examples of the method of determining the status of the vehicle 12 on a roadway will be described hereinbelow in conjunction with FIGS. 1 through 5, and examples of the method of communicating the status of the vehicle 12 on the roadway will be described below in conjunction with FIGS. 1 and 6. In some cases, the examples of the methods are automatically applied as soon as the user has set up an account with the telematics service center 24. In other cases, the examples of the methods are applied when the user has set up an account with the service center 24, and the user (who is now the owner of the account) has joined a vehicle status determination and communication service provided by the telematics service center 24. As used herein, the term "account" refers to a representation of a business relationship established between the user and the owner of the telematics service center 24, where such business relationship enables the user to request and receive services from the telematics service center 24. The business relationship may be referred to as a subscription agreement/contract between the user and the owner of the telematics service center 24, where such agreement generally includes, for example, the type of services that the user may receive, the cost for these services, the duration of the agreement (e.g., a one-year contract, etc.), and/or the like. In an example, the account may be set up by calling the telematics service center 24 (e.g., by dialing a phone number for the telematics service center 24 using the user's mobile (e.g., 98), home, or other phone) and requesting to (or selecting from a set of menu options) to speak with an advisor 62 to set up an account. In an example, the switch 68 at the telematics service center 24 routes the call to an appropriate advisor 62, who will assist the user with opening an/or setting up the user's account. When the account has been set up, the details of the agreement established between the telematics service center 24 owner and the user, as well as personal information of the user (e.g., the user's name, garage address, home phone number, cellular phone number, electronic mailing (e-mail) address, etc.) are stored in the user profile in the database 72 at the telematics service center 24 (as previously stated). The user profile may be used by the telematics service center 24, for example, when providing requested services or offering new services to the user.

When new services become available or the user has not yet signed up for existing services (such as, e.g., a vehicle status determination and communication service), the telematics service center 24 may notify the user of the services during a voice call between the user and telematics service center 24. Such a call may be initiated by either the user or the telematics service center 24. During the call, the advisor 62, 62' may notify the user of the service, and also ask the user if he/she would be interested in signing up for the service. If the user is conversing with an advisor 62, 62' when he/she indicates that he/she would be interested in the vehicle status determination and communication service, the advisor 62, 62' i) may sign the user up, ii) may provide the user with a phone number that he/she may use to directly access an appropriate division at the telematics service center 24 to sign up for the service, or iii) may route the user's call to the appropriate division at the telematics service center 24.

In another example, the user may be solicited by the telematics service center 24. In one example of such a solicitation, an advisor 62, 62' at the telematics service center 24 calls the user directly on his/her cellular phone. During the call, the user may be informed of the availability of the new vehicle status determination and communication service, and invite the user to sign up. The user may sign up for the service, if he/she so desires, during the same voice call with the telematics service center 24. In another example of such a solicitation, the telematics service center 24 may transmit an invitation to a user's account to join a new (or existing but not yet joined) service (such as the vehicle status determination and communication service). In this example, the telematics service center 24 may retrieve the user's e-mail address from his/her profile stored in the database 72, and then e-mail the invitation to the user. The invitation also includes instructions indicating how the user can go about signing up for the service, and a phone number for directly accessing the appropriate division at the telematics service center 24. Using the phone number listed in the invitation, the user may directly contact the division, and sign up for the service during the phone call.

When sent in an electronic mail format, the invitation to join the vehicle status determination and communication service may also include a hyperlink that, when selected (e.g., via a mouse click) by the user, takes the user to a webpage (not shown in FIG. 1) associated with the telematics service center 24. The user may then sign up for the service using that webpage.

Once the user has set up his/her account, or once the user has signed up for the vehicle status determination and communication service (if the service is not automatically applied as soon as the account is set up), an application including the algorithm and other pertinent computer programs including computer readable code are automatically downloaded, e.g., from the server 70 of the telematics service center 24 to the processor 36 associated with the telematics unit 14. In another example, an application (and/or any other programs) may be downloaded from the Internet via an online connection, from the Cloud, or the like. In some instances, the algorithm and any other pertinent computer programs for the methods may be stored in the telematics unit 14 by the manufacturer or the dealership. It is to be understood that the processor 36 of the telematics unit 14 runs or executes the algorithm and any other pertinent computer programs to ultimately determine the status of the vehicle 12 on a roadway, and to communicate the vehicle status to an outside entity. It is to be understood that the methods may be accomplished as many times as necessary or desired for the amount of time defined in the user's subscription agreement for the service, or for the amount of time that the account is active if the service is automatically applied upon setting up the account. In an example, if the user signs up for the service for six months, then the vehicle status determination and communication service may be applied during the six month subscription agreement. When the six month duration of the service is about to elapse (e.g., two weeks before the expiration, or at some other predefined period), for example, the telematics service center 24 may transmit one or more renewal invitations to the user to re-sign up for the service.

Additionally, the examples of the methods may be automatically applied each time the vehicle 12 is being driven or operated by a vehicle driver (i.e., the vehicle 12 is moving). In an example, the vehicle driver may elect to override the automatic application of the methods each time the vehicle 12 is being driven. This may be accomplished by selecting a command button or other feature associated with the telematics unit 14 that will temporarily suspend the application of the methods and/or by contacting the service center 24, and requesting to suspend or cancel the service.

The examples of the method of determining the status of the vehicle 12 on a roadway include i) determining a then-current operational state of the vehicle 12 (as will be described below in conjunction with FIG. 2), ii) determining whether or not the vehicle 12 is then-current caught in a traffic jam (as will be described below in conjunction with FIGS. 3 through 5, and iii) determining whether or not the vehicle 12 is no longer caught in the traffic jam if the vehicle 12 was previously caught in the traffic jam (as will also be described below in conjunction with FIGS. 3 through 5). It is to be understood that the determination of the then-current operational state of the vehicle 12 may be accomplished by the processor 36 by running one or more pertinent computer programs. The determination of whether or not the vehicle 12 is caught in a traffic jam, or is no longer caught in a traffic jam may be accomplished by the processor 36 running an algorithm that is separate from the computer programs used to determine the operational state of the vehicle 12. In an example, the algorithm includes one sub-routine for making the vehicle status determination. In another example, the algorithm also includes an additional sub-routine for determining if there is enough input data for the algorithm. Details of the computer programs/algorithms and the sub-routine(s) of the algorithm are provided below.

Figure 2:
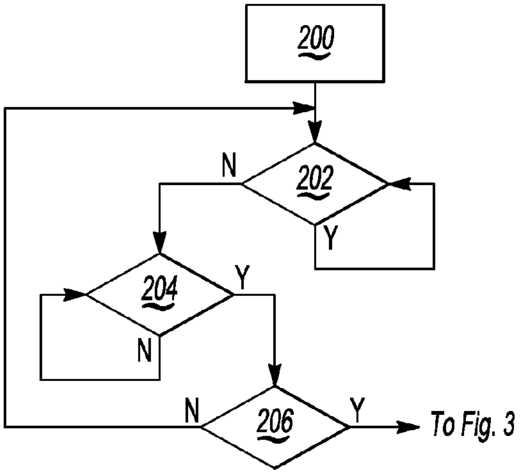
FIG. 2 is a logic flow diagram depicting an example of the method of determining the operational state of the vehicle.
Figure 3:
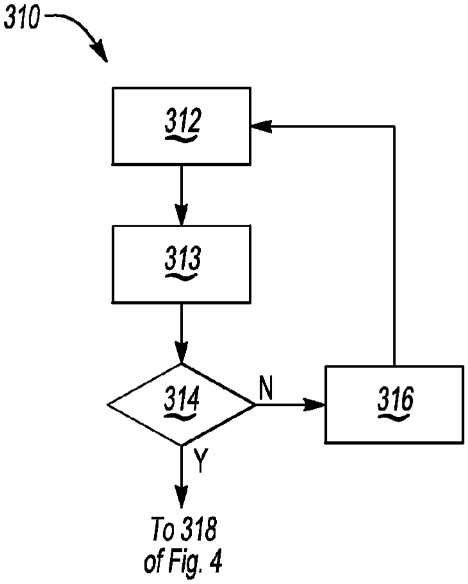
FIG. 3 is a logic flow diagram depicting an example of a sub-routine of an algorithm for determining the status of the vehicle on a roadway.

As shown in FIG. 2, determining the then-current operational state of the vehicle 12 via the computer program(s) mentioned above may be accomplished by initiating the vehicle ignition system (as shown by reference numeral 200), and then obtaining signals identifying the operational mode of the vehicle transmission system 100 (as shown by reference numeral 202) and signals pertaining to the state of motion of the vehicle (as shown by reference numeral 204). In an example, the vehicle ignition system may be initiated by switching the ignition system from an OFF state (i.e., where the vehicle 12 is not powered on) to an ON state (i.e., where the vehicle is powered on). This may be accomplished, for instance, by placing a key of the vehicle 12 into a vehicle ignition slot inside the vehicle 12, and turning the key to switch the ignition system from the OFF state to the ON state. Other ways of initiating the vehicle ignition system includes switching the ignition system via a button press on a driver control panel inside the passenger compartment of the vehicle 12, via a button press on a remote key fob, or via other known methods.

Once the vehicle ignition system has been switched to an ON state, the telematics unit 14 receives a signal from a processor associated with the vehicle transmission system 100 representing the then-current operational mode of the transmission system 100. The signal of the then-current operational mode of the transmission system 100 may show that the transmission system 100 is in a park mode, a drive mode, a reverse mode, or the like. In step 202, the method checks to see if the operational mode of the transmission system 100 is in a park mode. In an example, the operational mode of the transmission system 100 may be checked by the telematics unit 14 by querying for, and receiving the operational mode signal from the processor associated with the transmission system 100. For instance, the telematics unit 14 may request, and receive a signal from the transmission system 100 indicating that the transmission system 100 is then-currently in a park mode. In this case, the telematics unit 14 will repeatedly query the transmission system 100 for further signals until a signal is received by the telematics unit 14 showing that the transmission system 100 is in an operational mode other than a park mode (e.g., a drive mode, a reverse mode, etc.). Changing the operational mode of the transmission system 100 may be accomplished, for example, by the user by adjusting the transmission shifting lever from P (i.e., Park Mode) to D (i.e., Drive Mode) for automatic transmission systems or by releasing the parking break and possibly changing to the transmission from neutral to first gear or reverse for manual transmission systems. The signal may otherwise be automatically sent to the telematics unit 14 from the processor of the transmission system 100 periodically or each time the operational mode of the transmission system 100 is changed by the user (e.g., by adjusting the transmission shifting lever between the different operational modes, etc.) without the telematics unit 14 having to query the transmission system 100. The processor of the transmission system 100 may be pre-programmed to automatically send a signal to the telematics unit 14 periodically (e.g., every second, every 30 seconds, etc.), or to send a signal upon detecting that the transmission system 100 is no longer in park mode.

Once the telematics unit 14 has determined that the transmission system 100 is not in park mode, the telematics unit 14 will then determine whether or not the vehicle 12 is physically moving, as shown by reference numeral 204 in FIG. 2. This may be accomplished, for instance, by obtaining signals from the processor associated with the vehicle speed sensor 64 showing the then-current speed of the vehicle 12 ($V_{current}$) measured in mph, kmph, or the like. In one example, the speed signals are automatically sent from the speed sensor 64 to the processor 36, via the bus 34, periodically such as, e.g., every second, every 5 seconds, every 30 seconds, etc. In another example, the processor of the speed sensor 64 may be pre-programmed to monitor the vehicle speed itself, and upon detecting that the speed is greater than zero, automatically send a signal to the telematics unit 14 indicating the same. In yet another example, the speed signals are obtained in response to periodic queries by the telematics unit 14. In this case, the telematics unit 14 may send a command to the processor associated with the speed sensor 64 every second, every 5 seconds, every 30 seconds, etc., and the processor associated with the speed sensor 64 sends the speed signals to the telematics unit 14 in response to each command. The processor 36 may, for instance, determine that the vehicle 12 is moving if the then-current speed of the vehicle 12 exceeds zero.

Another way of determining that the vehicle 12 is moving may involve obtaining signals from the GPS location unit 44 onboard the vehicle 12, where the signals include GPS coordinate data of the vehicle 12 over a pre-set amount of time. The processor 36 of the telematics unit 14 compares the GPS coordinate data contained in the signals, and if the data shows that the location of the vehicle 12 has changed, then the telematics unit 14 may deduce that the vehicle 12 is physically moving.

If the then-current speed of the vehicle 12 (or GPS data) indicates, to the telematics unit 14, that the vehicle 12 is not moving, then the telematics unit 14 repeatedly checks the speed of the vehicle 12 (or the GPS data) until the telematics unit 14 determines that the vehicle 12 is moving. When movement detection occurs, the telematics unit 14 moves on to step 206, where the telematics unit 14 determines when the then-current vehicle speed (i.e., $V_{current}$) exceeds a pre-established threshold speed ($V_{threshold}$ measured in mph, kmph, etc.). This may be accomplished by checking the then-current speed of the vehicle 12 using, e.g., the same methods identified above for checking the vehicle speed to determine when the vehicle 12 is physically moving in step 204. However, in step 206, the methods are applied to determine when the vehicle speed has exceeded $V_{threshold}$. In instances where the telematics unit 14 determines that the then-current speed of the vehicle 12 has not exceeded the threshold speed, the method goes back to step 202 where the telematics unit 14 rechecks the operational mode of the transmission system 100. However, if the telematics unit 14 determines that the then-current speed of the vehicle 12 has exceeded the threshold speed, the process moves on to the sub-routine shown in FIG. 3, which will be described in further detail below.

The pre-established threshold speed may be a default value that was previously established by the user, the manufacturer, the telematics service center 24, or the like, and this threshold value may be set to any reasonable speed that is below an established speed limit of a particular roadway. In an example, the threshold value may be selected to be 20 mph. It is believed that this threshold value would cover a vast array of roadways (e.g., those having speed limits of 25 mph, 35 mph, 55 mph, etc.), and may eliminate or filter out initial driving conditions such as driving through a parking garage, driving through a subdivision, or the like. The threshold speed may otherwise be selected to be 10 mph, 15 mph, or any other reasonable value.

In another example, the threshold speed may be set to a value of 50 mph. At this speed, the vehicle status determination method would apply exclusively, for example, to highway driving, freeway driving, expressway driving, or any other driving where the speed limit exceeds 50 mph.

The threshold speed value may be set prior to driving the vehicle 12 or after the vehicle 12 has been driven. For instance, the threshold value may be set based, at least in part, on the location within which the vehicle 12 is typically driven. This may be defined by a radius constructed around the garage address of the vehicle owner (who is most likely also the vehicle driver). The threshold value may also be pre-set based on the type of environment in which the vehicle owner (or driver) lives. For example, if the garage address is in a geographic region that experiences rain or snow for at least part of a calendar year (e.g., Alaska, Minnesota, Maine, etc.) or is in a geographic region that has roads adjacent cliffs (e.g., Maui), the default threshold speed value may be relatively low. Off-board navigation information about a geographic area may also be used to adjust the threshold speed value.

The threshold speed value may also or otherwise be set based on habits of the vehicle driver and/or habits of other drivers, the latter of which may be learned from data obtained by the telematics unit 14 from respective telematics units of the other drivers (e.g., via vehicle-to-vehicle (V2V) communication).

As soon as the telematics unit 14 has determined that the vehicle speed has exceeded the threshold speed in step 206, the algorithm is initiated. This is shown in FIG. 3. At the outset of the algorithm, data is collected, cached, and then processed (step 312) to ultimately generate input data to run a first iteration sub-routine 212 of the algorithm. It is to be understood, as described further in reference to FIG. 5, that data collection and caching continues in the background throughout the execution of the algorithm, and such data is used to obtain updated input data for subsequent iterations of the sub-routine 212. In any of the data collection and caching steps disclosed herein, the data includes the then-current vehicle speed ($V_{current}$) and a then-current heading signal (H). The input data may include an average vehicle speed ($V_{avg}$) (which may be determined over the predetermined time period for which a single interval of the sub-routine 212 is completed, such as, e.g., 60 seconds), a change in vehicle heading (e.g., ΔH) (which may be determined from GPS coordinate data received from the GPS location unit 44), maximum vehicle speed, jitter, a ZeroCount, and other data. Further examples of the input data that may be used for the sub-routine 212 is set forth in Table 2 below. All the data that is processed to generate the input data for the sub-routine 212 may be received by the processor 36 from the appropriate vehicle systems/components via the bus 34.

During the first iteration of the algorithm, a sub-routine 310 is performed to determine if enough data is available to generate input data to initiate the first iteration of the sub-routine 212. This sub-routine 310 is shown in FIG. 3. Starting at step 312, the data cached by the telematics unit 14 as described above is processed utilizing a computer program executable by the processor 36 of the telematics unit 14, and the processed data is used as input data for the determination of whether or not the vehicle 12 is caught in a traffic jam, or is no longer caught in a traffic jam. In an example, the vehicle speed data that is cached, e.g., every second, may be used to determine an average vehicle speed ($V_{avg}$) over a time interval that has been predetermined for completing a single iteration of the sub-routine 212. The average vehicle speed may be determined by taking the sum of all of the vehicle speed measurements in mph (or kmph) during that time interval, and dividing that number by the number of measurements taken. As an illustrative example, if a speed measurement is taken by the speed sensor 64 every second for 60 seconds, then the sum of the speed measurements would be divided by the number 60.

Further, the GPS coordinate data that is cached, e.g., every second, may be used to determine a change in heading (ΔH) over the predetermined time interval. Obtaining the change in heading (ΔH) may be accomplished, for instance, by calculating the difference in the vehicle heading between two points every second, taking the sum of the calculated headings, and then dividing the sum by the predetermined time interval. This calculated value is the average change of the vehicle heading (ΔH) over the predetermined time interval.

The cached data is further processed to assign a change in the maximum vehicle speed ($\Delta V_{max}$), which may be determined by taking the difference between the maximum speed ($V_{max}$) the vehicle 12 traveled during the current predetermined time interval and the maximum speed the vehicle 12 traveled during the previous predetermined time interval. In an example, during the first iteration of the algorithm, the $V_{max}$ of the vehicle 12 during the previous 60 seconds would be zero, and thus the $\Delta V_{max}$ would be the $V_{max}$ during the current 60 second interval (i.e., $V_{max,\ current}$ minus 0). Further, a jitter value (e.g., in mph) may be assigned, which is determined from taking the difference between the maximum speed of the current predetermined time interval and the average vehicle speed described above. As previously mentioned, other input data that may be obtained or determined include a ZeroCount, a current value of the jam score, previous values of the average speed (e.g., at times t−1, t−2, and t−3), previous values of the change in heading (ΔH), a previous value of the jam score, and a previous value of the ZeroCount.

Once the data has been processed (at step 312), the method includes assigning the processed data a start counter value (at step 313). As used herein, a "start counter" refers to a numeric score representing if there is enough input data for the sub-routine 212 to be run, and this numeric score may be incremented after one or more iterations of the sub-routine 310. The start counter may be incremented by a single numerical digit, e.g., after a single iteration of the sub-routine 310 (e.g., the start counter may be incremented from a value of zero to a value of one; from a value of one to a value of two, etc.). It is further to be understood that the start counter is not decremented unless the algorithm is stopped completely (e.g., if the vehicle 12 is put into park), and at this time, the start counter is reset to the default value of zero.

During the first iteration of the sub-routine 310 at step 313, the processor 36 reviews the amount of processed data (from step 312), and assigns an initial numeric score that is based upon that amount. The processor 36 is configured to know the minimum amount of input data that is required to run the sub-routine 212, and the initial numeric scores are correlated with respective data amounts that may be above, below or at that minimum amount. After determining the amount of input data, the processor 36 can assign an appropriate initial score/start counter value.

The method then includes determining if the start counter value exceeds a threshold number, as shown at step 314. The threshold start counter value may be set to any desirable value, such as 3, 4, 5, etc., and this value will correspond with the minimum amount of input data required to run the sub-routine 212. In one example, the threshold value may be selected to be 3. In some instances, the larger the threshold value, the longer the duration of the sub-routine 310. This may be due, at least in part, to the looping of the sub-routine 310 in order to obtain enough input data for the sub-routine 212. This looping process is described further hereinbelow.

When the initial start counter value assigned by the processor 36 is greater than the threshold value, the sub-routine 212 is initiated. This is shown in FIG. 3 as "to 318 of FIG. 4".

However, when the initial start counter value assigned is less than or equal to the threshold value (i.e., answer to step 314 is no or N), the process moves to step 316 where the time period for obtaining data may be increased by a pre-selected amount of time. In an example, the pre-selected amount of time by which the time period may be increased could be 60 seconds, 100 seconds, 180 seconds, or any other time period that is desirable. In one example, the pre-selected amount of time is not larger than 255 seconds. Once the time period has been increased during step 316, the sub-routine 310 loops back to step 312 for a second iteration of the sub-routine 310, where further data (e.g., vehicle speed, GPS coordinate data, etc.) is processed during the increased time period. During the second iteration, for example, the processor 36 increments the previously assigned score by one (step 313), and compares this updated score to the threshold value (step 314). If the incremented score is greater than the threshold, the sub-routine 212 can be initiated at reference numeral 318 of FIG. 4. However, if the incremented score is still less than the threshold, the process again moves to step 316 where the time period for obtaining input data may be increased again by the pre-selected amount of time. It is to be understood that the sub-routine 310 will loop as many times as necessary to increment the start counter value until it exceeds the threshold. For example, if the initial start counter value is assigned to be one and the threshold value is three, the sub-routine 310 loops at least three times in order to obtain enough input data for the sub-routine 212 to be initiated. Once the start counter has exceeded the threshold value (in this example, the start counter value is incremented to three), then the process moves to step 318 of FIG. 4 where the sub-routine 212 is initiated.

Once the threshold value is exceeded, the sub-routine 310 is complete and is not run again until the algorithm is reinitiated (e.g., during a different ignition cycle).

Also once the threshold value is exceeded, the sub-routine 212 is initiated. The first iteration of sub-routine 212 (i.e., after enough data has been collected during the sub-routine 310) begins at reference numeral 318 of FIG. 4. Once triggered (as represented by reference numeral 318), the general flow of a single iteration of the sub-routine 212 of the algorithm includes determining if the vehicle 12 is caught in a traffic jam (as shown by step 324), and determining if the vehicle 12 is no longer caught in a traffic jam (as shown by step 330). In an example, the sub-routine 212 may also include a step for recognizing that the vehicle 12 may be caught in a traffic jam and storing location data at that time (reference numerals 320 and 322). This stored information may be used subsequently to identify the approximate location of the vehicle 12 at the beginning of the traffic jam, if it is determined at step 324 that the vehicle 12 is, in fact, in a traffic jam. For purposes of illustration, an example of sub-routine 212 will be described below as including steps 320 and 322.

When determining whether the vehicle 12 is stuck in a traffic jam (at step 324), the processor 36 determines whether a jam score (which may be incremented during iterations of the sub-routine 212) reaches or exceeds a predefined jam score. As used herein, a "jam score" refers to a numeric score representing the status of the vehicle 12 on the roadway, which may be incremented after one or more iterations of the sub-routine 212 are complete. It is to be understood that the jam score is set to a default value of zero upon initiating the sub-routine 212 at step 318 for the first time. The jam score may be incremented by a single numerical digit, e.g., after a single iteration of the sub-routine 212 (e.g., the jam score may be incremented from a value of zero to a value of one; from a value of one to a value of two; etc.). It is further to be understood that the jam score is not decremented unless the algorithm is stopped completely. At this time, the jam score will reset to the default value of zero, at which time the jam score is considered to be decremented.

One example of the sub-routine 212 will now be described below, and this example includes determining whether or not the vehicle 12 is then-currently caught in a traffic jam. Upon triggering the sub-routine 212 at step 318, the sub-routine 212 includes checking to see if the jam score equals a value of one at step 320. During the first iteration of the sub-routine 212, the jam score is equal to the default setting of zero, and thus the sub-routine 212 will pass through step 320 with no action, and go directly to step 324. At step 324, the sub-routine 212 applies a set of rules for determining whether or not the vehicle 12 is caught in a traffic jam. Basically, the sub-routine 212 applies one or more of these rules based on the input data to one of i) increment the jam score, or ii) do nothing. Further details of step 324 will be provided below in conjunction with Tables 1 and 2.

Referring back to step 320, subsequent iterations of the sub-routine 212 may, at some point, have incremented the jam score to a value of one. During an iteration when the jam score is a value of one at step 320, the process then moves to step 322 where information pertaining to a then-current location of the vehicle 12 (e.g., GPS coordinate data such as the vehicle's 12 location defined by its latitude and longitude) is retrieved from the GPS location unit 44, and such information is stored in the memory 38. It is believed that the then-current location information of the vehicle 12 when the jam score has been incremented to a value of one may reflect the location of where the vehicle 12 was first caught in a traffic jam. This information may be communicated to an outside entity when the processor 36 determines that the vehicle 12 is in fact caught in a traffic jam. In an example of step 320, upon determining that the jam score is one, the telematics unit 14 may query the GPS location unit 44 for longitude and latitude data of the then-current location of the vehicle 12, and the unit 44 may then send the information back to the telematics unit 14 via the bus 34. The telematics unit 14 stores the information in the memory 38, and such information is subsequently retrieved from the memory 38 after determining that the vehicle 12 is caught in the traffic jam. The retrieved information may be formatted by the processor 36 into a form suitable for communication of the information to the desired outside entity. This information may be communicated, along with a notice that the vehicle 12 is caught in a traffic jam, to apprise the outside entity of the location of the vehicle 12 when the vehicle 12 was first caught in the traffic jam. Further details of how the information is communicated will be described in detail below in conjunction with FIG. 6.

When the sub-routine 212 moves onto step 324, the processor 36 applies a plurality of rules of the sub-routine 212 to determine whether or not to increment the jam score based on the input data, as previously mentioned. One example of the rules for step 324 is set forth in Table 1 below, and the definitions of the terms used in these rules are set forth in Table 2. These rules are established using a threshold speed of 20 mph. It is to be understood, however, that the numbers used in these rules may be adjusted as desired.

The rules are applied during step 324 for several iterations of the sub-routine 212 until the processor 36 determines that i) the vehicle 12 is caught in a traffic jam, or ii) the vehicle 12 is not caught in a traffic jam. To determine if the vehicle 12 is caught in a traffic jam, certain rules of Table 1 will be applied until the jam score reaches or exceeds the predefined jam score for step 324. In an example, the predefined jam score may be set to any numeric value having a single digit that will represent that the vehicle 12 is in fact caught in a traffic jam. Examples of predefined jam scores include a predefined jam score of three, a predefined jam score of four, etc., and the predefined jam score may be set based, at least in part, on how quickly a determination of whether or not the vehicle 12 is caught in a traffic jam is desired. For instance, when the predefined jam score is set to 5, it will take longer to determine that the vehicle 12 is stuck than if the predefined jam score is set to 3. In an example, it may be desirable to set the predefined jam score to a higher value in instances where the vehicle 12 is being driven in a more congested area, as opposed to those instances where the vehicle 12 is being driven in a more open area. In the latter instance, it may be more desirable to have a lower jam score. It is to be understood that the processor 36 determines, by applying the rules of the sub-routine during step 324, that the vehicle 12 is not caught in the traffic jam if the jam score never reaches the predefined jam score during the duration of running the algorithm.

After the rules have been applied during a single iteration of the sub-routine 212, the jam score may be incremented by a single digit, or not incremented at all. Regardless of how the jam score changes or does not change, if the jam score has not reached or does not exceed the predefined jam score, the process moves on to step 330, at which rules are applied to determine if the vehicle 12 is no longer caught in a traffic jam. This portion of the sub-routine 212 has not yet been triggered, at least because the processor 36 has not determined that the vehicle 12 was previously caught. As such, the process will pass through step 330 and loop back to step 312. Upon looping back, the processor 36 processes updated data, which is cached during the time interval of the iteration of the sub-routine 212 that was just completed (see step 208 of FIG. 5, described further hereinbelow).

It is to be understood that after the rules have been applied for at least two iterations of the sub-routine 212, the jam score may be incremented so that it reaches or exceeds the predefined jam score. Referring back to step 324, when the processor 36 determines that the vehicle 12 is caught in a traffic jam (i.e., upon detecting that the jam score has reached or exceeded the predefined jam score), the process moves to step 326 where an indicator is triggered. The indicator triggered during step 326 generally signifies that the vehicle 12 is then-currently caught in a traffic jam. This indicator may take the form of an electronic flag (referred to herein as a "stuck flag"), and upon triggering the stuck flag, the processor 36 further triggers a method to communicate the status of the vehicle 12 (i.e., that the vehicle 12 is caught (or stuck) in a traffic jam) to an outside entity during step 328. The indicator may otherwise be represented as a binary digit, e.g., where the digit one represents that the vehicle 12 is caught in a traffic jam. In this latter example, the binary digit may be set to a default value of zero (indicating that the vehicle 12 is not caught) until the processor 36 determines that the vehicle 12 is caught in the traffic jam. At this time, the binary digit switches from the default value of zero to the value of one.

Once the processor 36 has determined that the vehicle 12 is caught, and such status information or data is communicated to an outside entity (e.g., facility 102), the sub-routine 212 is configured to by-pass the analysis made at step 324, so that the processor 36 can then determine when the vehicle 12 is no longer stuck, at step 330. In an example, the processor 36 determines that the vehicle 12 is no longer stuck when the jam score is decremented; i.e., reset to a value of zero. This may be accomplished by applying other certain rules of the sub-routine 212 set forth in Table 1, and when one or more of the rules are satisfied, the jam score is automatically reset. Tables 1 and 2 are set forth below:

TABLE 1

Rules for determining if vehicle is caught, or no longer caught in a traffic jam

| Rule | Jam Score |
|---|---|
| $V_{max} \leq 23$ mph;<br>Jitter $\leq 10$ mph;<br>$\Delta H_{current} \leq 3.3$ miles;<br>$\Delta V_{max} \geq -16$ mph;<br>$\Delta H_{previous} \leq 2$ miles;<br>$V_{avg\ current} \leq 0.9$ mph; and<br>Jam Score $<2$ | Reset Jam Score to Zero |
| $V_{current} < 25$ mph;<br>$V_{avg\ t\text{-}2} \geq 55$ mph;<br>$V_{avg\ t\text{-}1} \geq 50$ mph;<br>$\Delta H_{current} \leq 1$ mile; and<br>$\Delta H_{previous} \leq 1$ mile | Increase Jam Score by One |
| $V_{avg\ current} \geq 50$ mph; and<br>$V_{current} \geq 50$ mph | Reset Jam Score |
| $V_{current} \leq 25$ mph;<br>$V_{avg\ current} \leq 55$ mph;<br>$\Delta H_{current} < 0.55$ miles;<br>$\Delta H_{previous} \leq 1$ mile; and<br>$V_{avg\ t\text{-}1} \geq 50$ mph | Increase Jam Score by One |
| $V_{current} \leq 25$ mph;<br>$V_{avg\ current} \leq 55$ mph;<br>$\Delta H_{current} < 0.55$ miles;<br>$\Delta H_{previous} \leq 1$ mile; and<br>$V_{avg\ t\text{-}2} \geq 50$ mph | Increase Jam Score by One |
| $\Delta H_{current} \geq 1.5$ miles; and<br>$V_{current} \geq 35$ mph; | Reset Jam Score |
| $V_{avg\ current} \geq 35$ mph; and<br>Jam Score $\geq 3$ | Reset Jam Score |
| $V_{avg\ t\text{-}3} \geq 50$ mph;<br>$\Delta H_{current} < 1.25$ miles and $>0.2$ miles;<br>$\Delta H_{previous} < 1.2$ miles; and<br>$V_{current} < 39$ mph | Increase Jam Score by one |
| $V_{avg\ current} \leq 5$ mph;<br>$V_{avg\ t\text{-}1} \leq 5$ mph;<br>$V_{avg\ t\text{-}2} \leq 5$ mph; and<br>$\Delta H_{current} \leq 2$ miles | Increase Jam Score by one |
| ZeroCount $\geq 25$; and<br>$V_{max} \geq 25$ mph | Reset Jam Score |
| $\text{ZeroCount}_{previous} \geq 25$; and<br>$V_{max} \geq 24$ mph | Reset Jam Score |

TABLE 2

Definition of terms used in the rules set forth in Table 1

| | |
|---|---|
| $V_{max}$ | Maximum vehicle speed (mph) during an instant iteration of the sub-routine 212 |
| $V_{current}$ | Instantaneous vehicle speed (mph) |
| $V_{avg\ current}$ | Average vehicle speed (mph) during an instant iteration of the sub-routine 212 |
| $\Delta V_{max}$ | Difference between $V_{max}$ during the instant iteration of the sub-routine 212 and $V_{max}$ the iteration of the sub-routine 212 one period ago |
| $V_{avg\ t\text{-}1}$ | Average vehicle speed (mph) of the iteration of the sub-routine 212 one period ago |
| $V_{avg\ t\text{-}2}$ | Average vehicle speed (mph) of the iteration of the sub-routine 212 two periods ago |
| $V_{avg\ t\text{-}3}$ | Average vehicle speed (mph) of the iteration of the algorithm three periods ago |
| Jitter | Difference between the $V_{max}$ and the $V_{avg\ current}$ |
| $\Delta H_{current}$ | Average change in heading (miles) per second during an instant iteration of the sub-routine 212 |
| $\Delta H_{previous}$ | Average change in heading (miles) per second during the iteration of the sub-routine 212 one period ago |
| ZeroCount | Number of times the vehicle speed was 0 mph during the instant iteration of the sub-routine 212 |

TABLE 2-continued

| Definition of terms used in the rules set forth in Table 1 | |
|---|---|
| $\text{ZeroCount}_{previous}$ | The number of times the vehicle speed was 0 mph during the previous iteration of the sub-routine 212 |
| Jam Score | Numeric score representing the status of the vehicle on the roadway |

As an example, the set of rules set forth in the second substantive row of Table 1 may be used when determining whether the vehicle 12 is stuck, and the set of rules set forth in the first substantive row of Table 1 may be used when determining if the vehicle 12 is no longer stuck.

An example of the sub-routine 212 utilizing the rules set forth in Table 1 is provided hereinbelow:

```
If MaxSpeed <= 23 and Jitter <= 10 and DeltaHeading <= 3.3 and
DeltaMax > -16 and DeltaHeadingPrevious <=2 then
        If AverageSpeedt-1 <= 0.9 and JamScore < 2 then
                Reset JamScore
        Else
                Increase JamScore by 1
        End If
Else If Speed < 25 and AverageSpeedt-2 >= 55 and
AverageSpeedt-1 >= 50 and DeltaHeading <= 1 and
DeltaHeadingPrevious <= 1 then
        Increase JamScore by 1
Else If AverageSpeed >= 50 or Speed >= 50 then
        Reset JamScore
Else If Speed <= 25 and AverageSpeed <= 55 and DeltaHeading < 0.55
        and DeltaHeadingPrevious <= 1 and AverageSpeedt-1 >= 50 or
        Speed <= 25 and AverageSpeed <= 55 and DeltaHeading < 0.55
        and DeltaHeadingPrevious <=1 and Average Speedt-2 >= 50 then
        Increase JamScore by 1
Else If DeltaHeading >= 1.5 and Speed >= 35 or AverageSpeed >= 35 and
JamScore >= 3 then
        Reset JamScore
Else If AverageSpeedt-3 >= 50 and DeltaHeading < 1.25 and
        DeltaHeading > 0.2 and Speed < 39 and
        DeltaHeadingPrevious < 1.2 or AverageSpeed <= 5 and
        AverageSpeedt-1 <= 5 and AverageSpeedt-2 <= 5 and
        DeltaHeading <= 2 then Increase JamScore by 1
Else If ZeroCount >= 25 and MaxSpeed >= 25 or
ZeroCountPrevious >= 25 and MaxSpeed >= 25 then
        Reset JamScore
Else
        If JamScore >= 2 then
                Increase JamScore by 1
        Else
                Reset Jamscore
        End
```

It is to be understood that the portion of the sub-routine 212 for determining if the vehicle 12 is no longer caught in a traffic jam is applied similarly to that described above for determining if the vehicle 12 is caught. To reiterate from above, when the next iteration of the sub-routine 212 is triggered at step 318 (i.e., following a determination that the vehicle 12 is caught in a traffic jam), steps 320 and 324 are bypassed and the process goes directly to step 330 to determine when the vehicle 12 is no longer caught. Further, one or more iterations of the sub-routine 212 are applied until the jam score is reset to zero and thus the processor 36 determines that the vehicle 12 is no longer stuck.

Upon determining that the vehicle 12 is no longer caught in a traffic jam (i.e., when the jam score is reset to zero), the process moves to step 332 where either i) another indicator is triggered, or ii) the indicator that was triggered when the vehicle 12 was caught is switched to indicate that the vehicle 12 is no longer caught. In an example, the other indicator triggered during step 332 signifies that the vehicle 12 is no longer caught in a traffic jam, and this other indicator may take the form of another electronic flag (referred to herein as an "unstuck flag"). Upon triggering the unstuck flag, the processor 36 further triggers a method to communicate the status of the vehicle 12 (i.e., that the vehicle 12 is no longer caught (or stuck) in a traffic jam) to an outside entity during step 334. In another example, the indicator triggered when the vehicle 12 was caught may have taken the form of a binary digit, and upon detecting that the vehicle 12 is no longer stuck, this indicator may switch from a value of one (i.e., signifying that the vehicle 12 is stuck) to a value of zero (i.e., signifying that the vehicle 12 is no longer stuck).

In another example, when the processor 36 determined that the vehicle 12 is no longer stuck, the then-current location information of the vehicle 12 (e.g., longitude and latitude data) may be retrieved from the GPS unit 44 and stored in the memory 38. This information may be formatted by the telematics unit 14 to convert it to a human-readable form suitable for communication to the outside entity. It is believed that this information of the vehicle 12 would indicate the location of the vehicle 12 at the time the vehicle 12 was no longer caught in the traffic jam. This information may be communicated at step 334, and such communication will be further described in reference to FIG. 6.

As previously stated, the sub-routine 212 may be repeated for several iterations until the vehicle transmission system 100 is placed into a park mode, the vehicle ignition system is switched to an OFF state (e.g., the user has powered off the vehicle 12), or the like. Another trigger that may stop the sub-routine 212 includes detecting that the data used to obtain the input data for the algorithm is not valid as determined by a validity bit associated with each signal received by the telematics unit 14 from the appropriate vehicle systems/components.

Figure 5:
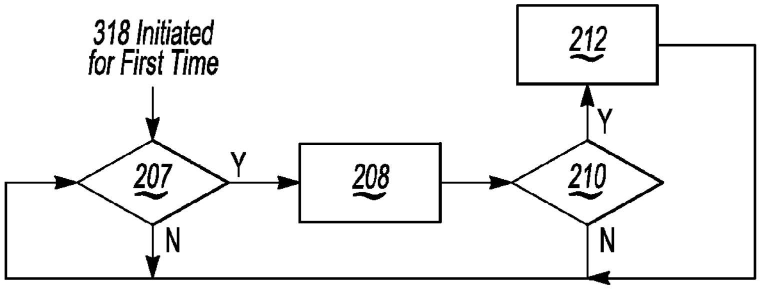
FIG. 5 is a logic flow diagram depicting an example of yet another sub-routine of the algorithm for determining the status of the vehicle on a roadway.
Figure 6:
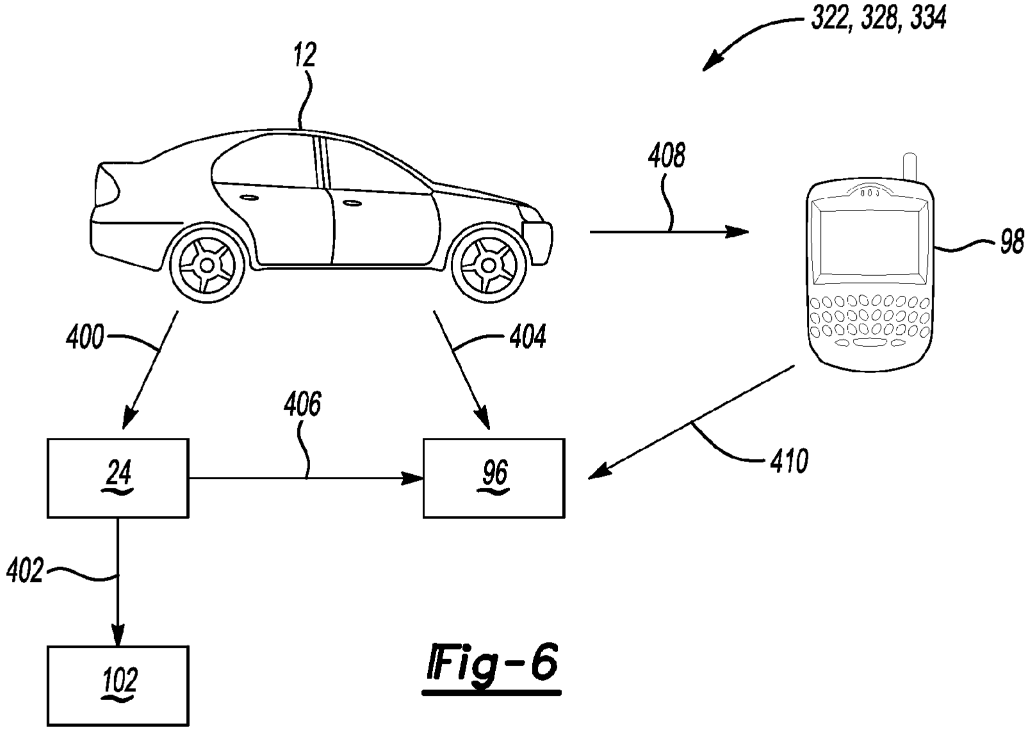
FIG. 6 is a flow diagram depicting examples of the method of communicating the status of the vehicle on the roadway.

Referring now to FIG. 5, while the sub-routine 310 and then the sub-routine 212 are being run, data sampling and storing is continuously run in the background. The time period for data sampling is the same time interval for a single iteration of the sub-routine 212. At step 207, data is gathered from the appropriate vehicle systems/components in response to a command by the processor 36. If data is gathered for less than the time period for data sampling, the process will loop back so that further data is gathered until the time period for data sampling has expired. When the time period expires, all of the data gathered at step 207 is cached at step 208.

The cached data in step 208 is used as input data for a subsequent iteration of the sub-routine 212. As such, for the first iteration of sub-routine 212, the input data is the data collected and processed during sub-routine 310. While the first iteration of sub-routine 212 is running, the data sampling and caching of steps 207 and 208 are also running After the first iteration of the sub-routine 212 is complete, the data collected and cached for the time interval set for step 207 is then utilized in the second iteration of the sub-routine 212.

After sampled data is cached at step 208, the algorithm determines, at step 210, whether a predetermined time interval has lapsed. This predetermined time interval corresponds with a time interval for completing one iteration of the sub-routine 212. If the iteration of the sub-routine 212 is not complete (N at step 210), the data sampling at step 207 continues. However, if the iteration of the sub-routine 212 is complete (Y at step 210), the algorithm will utilize the cached data (from step 208) as the input data for the next iteration of the sub-routine 212. In other words, sub-routine 212 repeats itself for a number of iterations, where a new iteration begins when the predetermined time interval has elapsed. The next iteration of the sub-routine 212 does not begin until the previous iteration is complete, i.e., the predetermined time interval has expired at step 210. As mentioned, if the predetermined time interval has not expired, the background data gathering process cycles back to step 207 to obtain further, updated input data for the next iteration of the sub-routine 212. In an example, the predetermined time interval may be set to any desired time interval, such as 30 seconds, 60 seconds, 120 seconds, or any other suitable time. As an illustrative example, the sub-routine 212 described herein in conjunction with FIG. 4 utilizes a predetermined time interval of 60 seconds. Each iteration of the sub-routine 212 is run every 60 seconds. It is to be understood that a single iteration of the sub-routine 212 runs during the 60 second interval, and then the sub-routine restarts at the beginning of the next iteration (i.e., the next 60 second interval) using updated input data obtained (at steps 207 and 208) in the background during the previous iteration.

Since steps 207-210 are run in the background, while one iteration of the sub-routine 212 is run, input data is always being collected and cached for a next iteration of the sub-routine 212.

It is to be understood that the process for determining whether or not the vehicle 12 is then-currently caught (or stuck) in a traffic jam on a roadway is triggered upon detecting, via the processor 36, that the then-current speed of the vehicle 12 has exceeded the pre-established threshold value, at step 206 shown in FIG. 2. It is further to be understood that once the algorithm is triggered, the algorithm continues to run until the operational mode of the vehicle transmission system 100 is set into park mode and/or the vehicle ignition is switched to an OFF state. Another trigger that may stop the algorithm includes detecting that the data used to obtain the input data for the sub-routine 212 is not valid as determined by a validity bit associated with each signal received by the telematics unit 14 from the appropriate vehicle systems/components during steps 207 and 208.

One illustrative example of how the algorithm may be used to determine the vehicle status will now be described herein in conjunction with FIGS. 3 through 5. Starting at a jam score of zero, the processor 36 processes input data at step 312, and upon determining that there is enough input data during step 314, triggers the sub-routine 212 in step 318. Since the jam score is currently at a value of zero, the process passes through step 320 and at step 324 applies the rules to the input data in order to determine if the vehicle 12 is caught in traffic. Based on the results of the application of the rules, the jam score may be incremented to a value of one, or may stay at a value of zero. As part of the rules, the incremented or non-incremented jam score is thereafter compared to the predefined jam score (such as a jam score of three). For this iteration of the sub-routine 212, a jam score of one or zero is below the predefined score, and thus the process passes through step 330 and loops back to step 312 where updated input data is processed. This updated input data is retrieved during steps 207 and 208 of FIG. 5, which were running in the background while the sub-routine 212 in FIG. 4 was being executed. Another iteration of the sub-routine 212 is then initiated in step 318. The rules are again applied at step 324, except this time updated data is utilized, to increment or not increment the jam score.

The loops described immediately above for this example are repeated as many times, with updated data, as necessary until the jam score reaches or exceeds a jam score of three. If the jam score continuously remains below the predefined jam score, the loops continue to repeat as many times as necessary until the sub-routine 212 is stopped completely (e.g., by placing the transmission gear of the vehicle 12 into a park mode), at which time the jam score is reset to zero. If, however, the jam score reaches or exceeds the predefined jam score of three, a determination is made that the vehicle 12 is caught in traffic, and the process loops back to step 312. In this iteration, further updated input data (from steps 207 and 208) is used to determine if the vehicle 12 is no longer caught in traffic. During these next iterations, the process passes through steps 320 and 324, and applies the rules specific for step 330 until the jam score is reset, as previously described. At this time, the processor 36 determines that the vehicle 12 is no longer caught in the traffic jam.

It is to be understood that when the processor 36 makes the determination that the vehicle 12 is no longer caught in the traffic jam in step 330, and the jam score is reset to zero, the process continues to repeat itself to determine if the vehicle 12 is caught in another traffic jam somewhere down the road. Thus, for example, the sub-routine 212 of the algorithm may be repeatedly applied to determine when the vehicle 12 is caught or no longer caught in one, two, three, or more traffic jams during a single trip.

In an example, the algorithm may be prevented from shutting down or stopped in the event that the transmission system 100 of the vehicle 12 is placed into park mode while the vehicle 12 is caught in a traffic jam (e.g., if the vehicle driver is tired of pressing the brake pedal, etc.). For instance, the algorithm may include a rule or computer readable code that recognizes that the jam score has a value greater than zero. Since the vehicle 12 was previously determined to be caught in traffic, the processor 36 then-currently believes that the vehicle 12 is still caught in traffic because it has not yet determined that the vehicle 12 is no longer caught in traffic based on the jam score.

It is to be understood that the determinations about the vehicle 12 status may be communicated from the telematics unit 14 to an outside entity, as mentioned above. Examples of the methods that may be used to communicate this information will now be described hereinbelow in conjunction with FIG. 6.

In one example, the outside entity may be the telematics service center 24, and the information obtained at steps 322, 328, 334 may be communicated directly from the telematics unit 14 to the service center 24, as shown at reference numeral 400. This may be accomplished, for instance, by initiating a vehicle data upload event with service center 24 using the VDU unit 91 of the telematics unit 14, and transmitting the information as packetized data to the service center 24. The telematics service center 24 may utilize the information to provide certain personalized services to the vehicle 12 upon learning that the vehicle 12 is then-currently caught in a traffic jam (from step 328), upon learning that the vehicle 12 is no longer caught in the traffic jam (from step 334), or the location information (latitude and longitude data) of the vehicle when first caught (from step 322) or when no longer caught (also from step 334). For instance, upon learning that the vehicle 12 is caught in a traffic jam, the telematics service center 24 may initiate a data connection with the telematics unit 14 of the vehicle 12 using the communications module 86 to provide services that may the vehicle user may desire during the time that the vehicle 12 is stuck. Examples of these services may include alternate navigation instructions to route the vehicle 12 around the traffic jam, emergency services if the vehicle 12 needs assistance (e.g., has a flat tire, etc.,), entertainment services, or the like. In some instances, the service provider 24 may request vehicle data during the packet data session so that certain services may be provided. Further, upon learning that the vehicle 12 is stuck, the service center 24 may also initiate a voice connection with the vehicle user through the telematics unit 14 so that the service center 24 can obtain additional information, such as information about the current traffic conditions directly from the vehicle user.

In another example, the outside entity may be another facility 102, such as a traffic control center, a police station, a fire station, etc. In this example, the telematics service center 24 may forward the information received from the telematics unit 14 to the other facility 102, as shown by reference numeral 402. The forwarding of the information may be accomplished by transmitting the information as packetized data upon receiving it from the telematics unit 14 using the communications module 86. In some instances, however, the data aggregator 104 re-formats the packetized information so that the information may be viewable or otherwise usable by the other facility 102. The information may be utilized by the other facility 102 for a variety of purposes, such as to determine current traffic conditions on the roadway or the like.

Figure 4:
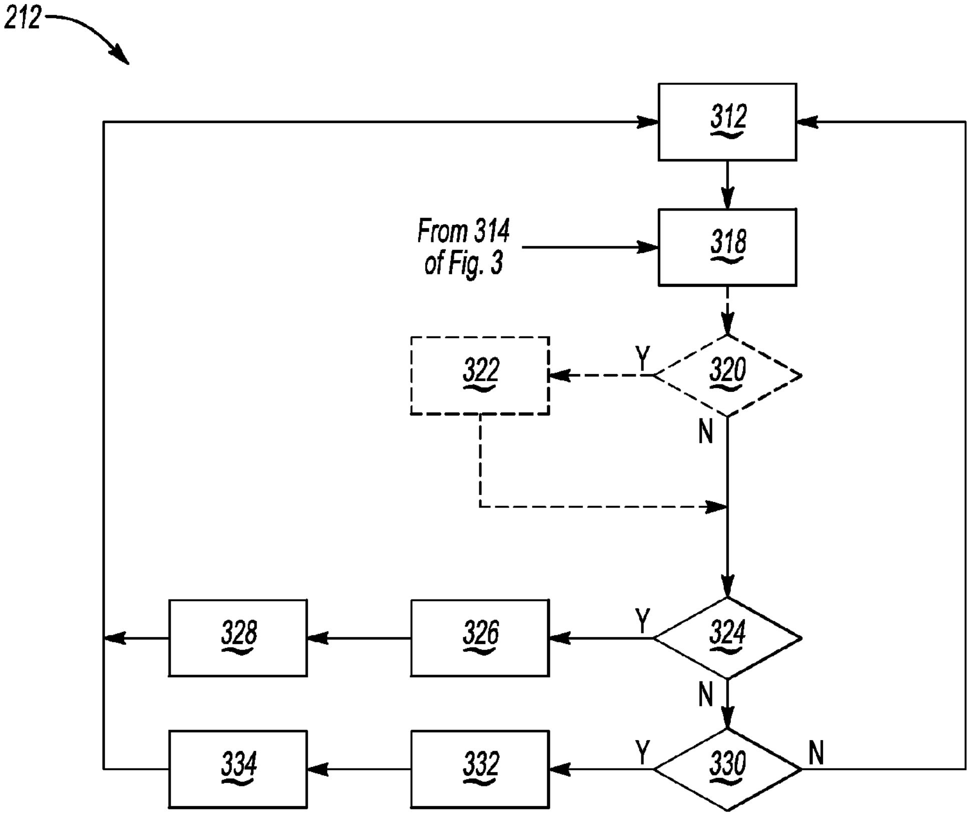
FIG. 4 is a logic flow diagram depicting an example of another sub-routine of the algorithm for determining the status of the vehicle on a roadway.

In yet another example, as shown by reference numeral 406 in FIG. 4, the data aggregator 104 at the telematics service center 24 may automatically upload the information as a post onto the host server 94 of the user's personal webpage 96. In other words, the service center 24 posts the information onto the user's webpage 96. For instance, upon receiving the packetized information, the data aggregator 104 identifies the account associated with the telematics unit 14 from which the information was sent. This may be accomplished by identifying the telematics unit 14 initiating the packet data session (e.g., via its mobile dialing number (MDN)). Thereafter, the data aggregator 104 un-packetizes the information, and re-formats the information in the form of a post that may be uploaded onto the host server 94 of the user's webpage 96. The uploaded post may then be viewable by friends of the user's online networking group (i.e., those who have been authorized to access and view the user's webpage 96). Further, one or more of the user's friends may reply to the post by posting their responses, and in some instances a blog may be generated by the posts.

The information pertaining to the vehicle status may be posted, by the telematics service center 24, in the form of a text post. Thus, in an example, the packetized information received by the aggregator 104 is un-packetized, and re-formatted (via, e.g., software programs run by the data aggregator 104 or the processor 84 at the service center 24) so that the information is in a human-readable form. In another example, the information may be presented on the user's webpage 96 as an audio post. In this example, the information is un-packetized, re-formatted into text, and then converted from text to speech using a text-to-speech program run by the data aggregator 104 or the processor 84. The audio post may then be posted on the webpage 96 to be viewed (listened to) by the user's friends.

In some cases, the user may designate preferences, which are stored in his/her profile at the telematics service center 24, and these preferences may include the preferred presentation of the text post and/or the audio post to be posted onto the user's webpage 96. These preferences may be established, by the user, by accessing a remotely accessible webpage of the telematics service center 24, and after submitting an appropriate login and password to access his/her account, selecting or inputting the user's preferences into the webpage. The preferences may also be established, by the user, by calling the service center 24 (using the telematics unit 14, the user's mobile device 98, a landline phone, or the like), and after authenticating the user if necessary, the user may recite his/her preferences to an advisor 62, 62' during the voice call. The advisor 62, 62', who has access to the user's account, stores the user's preferences in the user profile during the call.

Further, another example of communicating the information includes posting the information of the vehicle status onto the user's webpage 96 directly from the telematics unit 14, as shown by reference numeral 404. In this example, the telematics unit 14, via the processor 36, may re-format the vehicle status information as, for instance, a text post and establishes an Internet connection so that the telematics unit 14 can upload the text post onto the host server 94 of the user's webpage 96. Before the text post is uploaded, the text post may be further formatted according to the user's preferences stored in the user profile. These preferences may be obtained by requesting and obtaining the preferences from the telematics service center 24 during a packet data session. The user preferences may otherwise be obtained from a user profile stored in the memory 38 of the telematics unit 14. This profile may be stored in the memory 38 when the preferences were set by the user, as previously described.

In still another example, the telematics unit 14 may transmit the information to the user's mobile communications device 98 (as shown by reference numeral 408), which may then be used to upload the information onto the host server 94 of the user's webpage 96 (as shown by reference numeral 410). Transmission of the information to the mobile device 98 may be accomplished upon establishing a short range wireless connection between the telematics unit 14 and the mobile device 98 via the short range wireless communication unit 48 (e.g., the BLUETOOTH® unit). In an example, the telematics unit continuously monitors for the presence of the mobile device 98 using a short range wireless antenna 51 (shown in FIG. 1), and attempts to connect with the device 98 upon recognizing the presence of the mobile device 98. In another example, the mobile device 98 continuously monitors for the presence of the telematics unit 14 using its own short range wireless antenna 99 (shown in FIG. 1). The mobile device 98 attempts to connect with the telematics unit 14 upon recognizing the presence of the telematics unit 14; which typically occurs as soon as the mobile device 98 is placed within the short range wireless range of the telematics unit 14. The mobile device 98 or the telematics unit 14 alone may be configured to monitor for the presence of the other device, or both of the devices 14, 98 may be configured to monitor for the presence of the other device at the same time.

It is to be understood that the mobile device 98 and the telematics unit 14 attempt to connect during each encounter between the devices 98, 14 after the devices 14, 98 have been paired. The mobile device 98 and the telematics unit 14 are actually paired when the telematics unit 14 and the mobile device 98 exchange security codes/passwords with each other. This enables the telematics unit 14 and the mobile device 98 to communicate typically under a secured connection. As a more specific example, pairing may involve setting the mobile device 98 to a short range wireless discovery mode (such as by selecting, on the device 98, a discovery mode function as a menu option, icon, or the like). While in the discovery mode, other devices having a short range wireless communication system (such as the telematics unit 14) are allowed to detect the presence of the mobile device 98. When the telematics unit 14 locates the device 98, the device 98 automatically provides the type of device it is (e.g., a cellular phone) and its short range wireless connection name. This short range wireless connection name may, for instance, be selected by the user or provided by the manufacturer of the device 98. The device 98 may then prompt the user to enter a security code/password, and this security code/password is sent to the telematics unit 14. Upon receiving the security code/password, the telematics unit 14 sends its own security code/password to the device 98 to ultimately pair the two devices 14, 98 together.

Once the two units 14, 98 have been paired and whenever within short range wireless communication range of each other, the telematics unit 14 can directly communicate with the mobile device 98, and voice communications received at the mobile device 98 are transmitted to the user hands-free via the telematics unit 14.

When the two devices 14, 98 are connected via the short range wireless connection unit 48, the telematics unit 14 transmits the data directly to the mobile device 98, as previously mentioned. Upon receiving the data, the mobile device 98 may re-format the data into a form suitable for uploading onto the host server 94 of the user's webpage 96 as a text post. The re-formatting of the vehicle status information may be accomplished using an application resident of the mobile device 98, which may have been downloaded to the device 98 from a webpage of the telematics service center 24 or an application store associated with the mobile device 98.

It is to be understood that vehicle status information (and, in some cases, the latitude and longitude data of the vehicle's location) is communicated to the outside entity after determining that the vehicle 12 is caught in a traffic jam, and a separate communication of the vehicle status information is transmitted after determining that the vehicle 12 is no longer caught in the traffic jam. It is to be understood that other information in addition to the vehicle status may be communicated to the outside entity, such as a then-current location of the vehicle 12, the day and time of day that the determination(s) were made, etc. It is to be understood that the other information included in the communication may be subject to the user's preferences stored in the user profile.

While several examples have been described in detail, it will be apparent to those skilled in the art that the disclosed examples may be modified. Therefore, the foregoing description is to be considered non-limiting.

The invention claimed is:

1. A method of determining a status of a vehicle on a roadway, comprising:

monitoring a then-current vehicle speed by a processor operatively disposed in the vehicle, the processor executing computer readable code encoded on a non-transitory computer readable medium;

during the monitoring, via the processor executing the computer readable code, determining that the then-current vehicle speed has exceeded a threshold speed; and triggering an algorithm upon determining that the then-current vehicle speed has exceeded the threshold speed, the algorithm including computer readable code encoded on the non-transitory computer readable medium of the processor, wherein triggering the algorithm initiates a sub-routine included in the algorithm wherein the sub-routine includes computer readable code for:

processing data over a predetermined time interval to obtain input data, the data being chosen from an average vehicle speed, a vehicle heading signal, and combinations thereof;

one of maintaining or incrementing a jam score based on the input data, the incrementing including changing the jam score by a single numerical digit;

processing updated data over at least one other predetermined time interval to obtain updated input data;

one of maintaining or incrementing the jam score based on the updated input data; and when the jam score reaches a predefined jam score, the method further includes triggering an indicator signifying that the vehicle is then-currently in a traffic jam; or when the jam score is maintained below the predefined jam score, the method further includes repeating the processing of updated data and the one of maintaining or incrementing the jam score until the algorithm is stopped or the jam score reaches the predefined jam score.

2. The method as defined in claim 1 wherein prior to the monitoring, the method further comprises triggering the monitoring upon i) detecting that the vehicle ignition is in an ON state and the vehicle transmission system is in an operational mode other than park mode, or ii) detecting that a time period has elapsed.

3. The method as defined in claim 1 wherein subsequent to processing and prior to one of maintaining or incrementing, the method further includes:

assigning the input data a start counter value;

determining if the assigned start counter value exceeds a threshold start counter value; and initiating the one of maintaining or incrementing when the assigned start counter value exceeds the threshold start counter value.

4. The method as defined in claim 1 wherein subsequent to processing and prior to one of maintaining or incrementing, the method further includes:

assigning the input data a start counter value;

determining if the assigned start counter value exceeds a threshold start counter value; and when the assigned start counter value is less than or equal to the threshold start counter value, the method further includes:

increasing a time period for obtaining data;

processing the data obtained during the increased time period;

incrementing the assigned start counter value by a single numerical digit; and when the incremented start counter value exceeds the threshold start counter value, initiating the one of maintaining or incrementing.

5. The method as defined in claim 1 wherein during an iteration of the sub-routine, the method further includes:

sampling vehicle data; and caching the vehicle data in a memory operatively associated with the processor in the vehicle, the cached vehicle data being used as, or to obtain input data for a subsequent iteration of the sub-routine.

6. The method as defined in claim 1 wherein upon triggering the indicator, the method further comprises triggering a method for communicating the indicator to an entity outside of the vehicle.

7. The method as defined in claim 1 wherein during the sub-routine and wherein the jam score equals a value of one, the method further comprises:

obtaining then-current vehicle location information from an in-vehicle location detection unit; and storing the then-current vehicle location information in a memory operatively associated with the processor in the vehicle.

8. The method as defined in claim 1 wherein upon triggering the indicator signifying that the vehicle is then-currently caught in the traffic jam, the method further comprises:

continuously executing the sub-routine so that additional updated data is processed; and upon resetting the jam score based upon the processed additional updated data, one of i) triggering an other indicator, or ii) switching the indicator to signify that the vehicle is no longer in the traffic jam.

9. The method as defined in claim 8 wherein upon triggering the other indicator or switching the indicator, the method further comprises triggering a method for communicating the other indicator or the switched indicator to an entity outside of the vehicle.

10. A method of communicating a status of a vehicle on a roadway, comprising:

monitoring a then-current vehicle speed utilizing vehicle speed signals obtained by a processor operatively associated with a telematics unit disposed in a vehicle from an other processor operatively associated with an in-vehicle speed sensor, the processor associated with the telematics unit executing computer readable code encoded on a non-transitory computer readable medium;

executing an algorithm encoded on the non-transitory computer readable medium of the processor associated with the telematics unit upon determining, by the processor during the monitoring, that the then-current vehicle speed has exceeded a pre-established threshold value;

upon executing the algorithm, generating an indicator signifying that the vehicle is then-currently caught in a traffic jam; and via the telematics unit, communicating vehicle status data pertaining to the indicator to an outside entity.

11. The method as defined in claim 10 wherein the algorithm includes a sub-routine including:

computer readable code for processing data over a predetermined time interval to obtain input data, the data being chosen from an average vehicle speed, a vehicle heading signal, and combinations thereof;

computer readable code for one of maintaining or incrementing a jam score based on the input data, the incrementing including changing the jam score by a single numerical digit;

computer readable code for processing updated data over at least one other predetermined time interval to obtain updated input data;

computer readable code for one of maintaining or incrementing the jam score based on the updated input data;

computer readable code for triggering an indicator signifying that the vehicle is then-currently in a traffic jam when the jam score reaches a predefined jam score; and computer readable code for repeating the processing of updated data and the one of maintaining or incrementing the jam score when the jam score is maintained below the predefined jam score.

12. The method as defined in claim 10 wherein the communicating of the vehicle status data includes transmitting vehicle status data to a telematics service center during a vehicle data upload event.

13. The method as defined in claim 12 wherein upon receiving the vehicle status data at the telematics service center, the method further comprises one of i) transmitting, via a communications module at the telematics service center, the vehicle status data to an other facility, or ii) posting, via one of a processor or a data aggregator at the telematics service center, the vehicle status data onto a remotely accessible networking page.

14. The method as defined in claim 10 wherein the communicating of the vehicle status data includes, via the telematics unit, automatically posting the vehicle status data on a remotely accessible networking page.

15. The method as defined in claim 10 wherein the communicating of the vehicle status data includes:

transmitting the vehicle status data from the telematics unit to a mobile communications device, the transmitting being accomplished via a short range wireless connection established between the telematics unit and the mobile communications device; and via an application resident on the mobile communications device, automatically posting the vehicle status data on a remotely accessible networking page.

16. A system for communicating a status of a vehicle on a roadway, comprising:

at least one vehicle speed sensor operatively disposed in the vehicle for generating signals pertaining to a then-current speed of the vehicle;

a telematics unit operatively disposed in the vehicle, the telematics unit including a processor executing computer readable code encoded on a non-transitory computer readable medium of the processor for determining that a then-current speed of the vehicle has exceeded a pre-established threshold value;

an algorithm encoded on the non-transitory computer readable medium of the processor, the algorithm being executable upon determining, via the processor, that the then-current speed of the vehicle has exceeded the pre-established threshold value, the algorithm including a sub-routine which includes:

computer readable code for processing data over a predetermined time interval to obtain input data, the data being chosen from an average vehicle speed, a vehicle heading signal, and combinations thereof;

computer readable code one of maintaining or incrementing a jam score based on the input data, the incrementing including changing the jam score by a single numerical digit;

computer readable code for processing updated data over at least one other predetermined time interval to obtain updated input data;

computer readable code for one of maintaining or incrementing the jam score based on the updated input data;

computer readable code for triggering an indicator signifying that the vehicle is then-currently in a traffic jam when the jam score reaches a predefined jam score; and computer readable code for repeating the processing of updated data and the one of maintaining or incrementing the jam score when the jam score is maintained below the predefined jam score;

wherein the telematics unit communicates vehicle status data pertaining to the indicator to an outside entity.

17. The system as defined in claim 16 wherein the outside entity is a telematics service center in selective communication with the telematics unit, the telematics service center including:

a data aggregator for processing the vehicle status data received from the telematics unit during a vehicle data upload event initiated by a vehicle data upload unit operatively associated with the telematics unit; and a communications module for transmitting the vehicle status data to an other facility.

18. The system as defined in claim 16, further comprising:

a telematics service center in selective communication with the telematics unit, the telematics service center including a data aggregator for processing the vehicle status data received from the telematics unit during a vehicle data upload event initiated by a vehicle data upload unit operatively associated with the telematics unit; and a remotely accessible networking page upon which a post containing the vehicle status data is posted by one of the data aggregator or a processor at the telematics service center.

19. The system as defined in claim 16, further comprising a remotely accessible networking page upon which the vehicle status data is posted directly from the telematics unit.

20. The system as defined in claim 16 wherein the sub-routine further includes:

computer readable code for continuously executing the sub-routine so that additional updated data is processed;

computer readable code for resetting the jam score based upon the processed additional updated data; and computer readable code for one of i) triggering an other indicator, or ii) switching the indicator to signify that the vehicle is no longer in the traffic jam.

21. The system as defined in claim 20 wherein the outside entity is a telematics service center in selective communication with the telematics unit, the telematics service center including:

a data aggregator for processing other vehicle status data received from the telematics unit during a vehicle data upload event initiated by a vehicle data upload unit operatively associated with the telematics unit; and a communications module for transmitting the other vehicle status data to an other facility.

22. The system as defined in claim 20, further comprising:

a telematics service center in selective communication with the telematics unit, the telematics service center including a data aggregator for processing other vehicle status data received from the telematics unit during a vehicle data upload event initiated by a vehicle data upload unit operatively associated with the telematics unit; and a remotely accessible networking page upon which a post containing the other vehicle status data is posted by one of the data aggregator or a processor at the telematics service center.

23. The system as defined in claim 20, further comprising a remotely accessible networking page upon which an other vehicle status data is posted directly from the telematics unit.

* * * * *